(12) United States Patent
Stalcup et al.

(10) Patent No.: US 12,478,484 B2
(45) Date of Patent: Nov. 25, 2025

(54) BONE FUSION DEVICE

(71) Applicant: SMed-TA/TD, LLC, Columbia City, IN (US)

(72) Inventors: Gregory C. Stalcup, Fort Wayne, IN (US); William T. Newman, Fort Wayne, IN (US); Kreigh R. Williams, Fort Wayne, IN (US)

(73) Assignee: SMed-TA/TD, LLC, Columbia City, IN (US)

( * ) Notice: Subject to any disclaimer, the term of this patent is extended or adjusted under 35 U.S.C. 154(b) by 0 days.

(21) Appl. No.: 17/824,591

(22) Filed: May 25, 2022

(65) Prior Publication Data

US 2022/0387185 A1 Dec. 8, 2022

Related U.S. Application Data

(60) Provisional application No. 63/195,821, filed on Jun. 2, 2021.

(51) Int. Cl.
| | |
|---|---|
| *A61B 17/84* | (2006.01) |
| *A61B 17/86* | (2006.01) |
| *A61F 2/02* | (2006.01) |
| *A61F 2/46* | (2006.01) |
| *A61F 2/28* | (2006.01) |
| *A61F 2/30* | (2006.01) |

(52) U.S. Cl.
CPC ............... *A61F 2/46* (2013.01); *A61F 2/02* (2013.01); *A61F 2002/2835* (2013.01); *A61F 2002/30316* (2013.01)

(58) Field of Classification Search
CPC ...... A61F 2/46; A61F 2/02; A61F 2002/2835; A61F 2002/30316; A61B 17/8605; A61B 17/8625; A61B 17/863; A61B 17/864; A61B 17/866; A61B 17/8665; A61B 17/8685; A61B 2017/8655; A61B 2017/867; A61B 2017/8675; A61B 2017/868

See application file for complete search history.

(56) References Cited

U.S. PATENT DOCUMENTS

| | | | |
|---|---|---|---|
| 10,531,905 B2 * | 1/2020 | Gault | A61B 17/8605 |
| 10,653,455 B2 * | 5/2020 | Lehman, Jr. | A61B 17/7037 |
| 2014/0031934 A1 * | 1/2014 | Trieu | A61B 17/8685 |
| | | | 623/17.11 |
| 2016/0287301 A1 * | 10/2016 | Mehl | A61B 17/8685 |
| 2020/0268525 A1 | 8/2020 | Mesiwala et al. | |

OTHER PUBLICATIONS

Extended European Search Report dated Oct. 27, 2022 for European Patent Application No. 22176684.3 (8 pages).
European Communication pursuant to Article 94(3) EPC dated Jul. 17, 2024 for European Patent Application No. 22176684.3 (3 pages).

* cited by examiner

*Primary Examiner* — Tracy L Kamikawa
(74) *Attorney, Agent, or Firm* — TAYLOR & EDELSTEIN, PC

(57) ABSTRACT

A bone fusion device includes: a shaft including a porous section and a threaded proximal section configured for facilitating a compression; and a head threadably connected to the threaded proximal section, the head including a plurality of teeth configured for engaging with a bone, the bone fusion device being formed as a fastener.

8 Claims, 11 Drawing Sheets

BONE FUSION DEVICE

CROSS REFERENCE TO RELATED APPLICATIONS

This is a non-provisional application based upon U.S. provisional patent application Ser. No. 63/195,821, entitled "BONE FUSION DEVICE", filed Jun. 2, 2021, which is incorporated herein by reference.

BACKGROUND OF THE INVENTION

1. Field of the Invention

The present invention relates to tissue fusion devices, and, more particularly, to bone fasteners and methods for using same.

2. Description of the Related Art

Various types of bone fusion devices are known, various types of medical fasteners. Such fasteners include bone screws and bone pins. Further, the Arthrex suture product line provides for suture compression.

What is needed in the art is an improved way of providing compression to bone tissue using bone fusion devices.

SUMMARY OF THE INVENTION

The present invention provides bone fusion devices which provide for enhanced and thus improved compression to bone tissue.

The invention in one form is directed to a bone fusion device, including: a shaft including a porous section and a threaded proximal section configured for facilitating a compression.

The invention in another form is directed to a bone fusion device, including: a shaft including an expandable portion configured for facilitating a compression.

The invention in yet another form is directed to a method of fusing tissue together, the method including the steps of: providing a suture, a first button, and a second button, the suture including a first end and an opposing second end; attaching the second end to the second button; passing the second button through a mechanical bore extending through a first bone portion; affixing the second button to a second bone portion; and creating a linear compression between the first bone portion and the second bone portion by way of the suture, the first button, and the second button.

An advantage of the present invention is that it provides enhanced fixation of the medical fastener to bone, inhibiting the fastener from pull-out, slip-out, or otherwise working itself out of the bone during use.

Another advantage is that some embodiments provide enhanced compression for bone fusion using buttons and a bored pin or drill.

Yet another advantage is that the present invention can be used to span a sacrum-iliac joint for fusion surgery, but could be used in other similar surgical procedures.

Yet another advantage is that certain embodiments of the present invention are shown individually but can be combined into a single implant, such as a single bone screw or bone pin, as desired.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
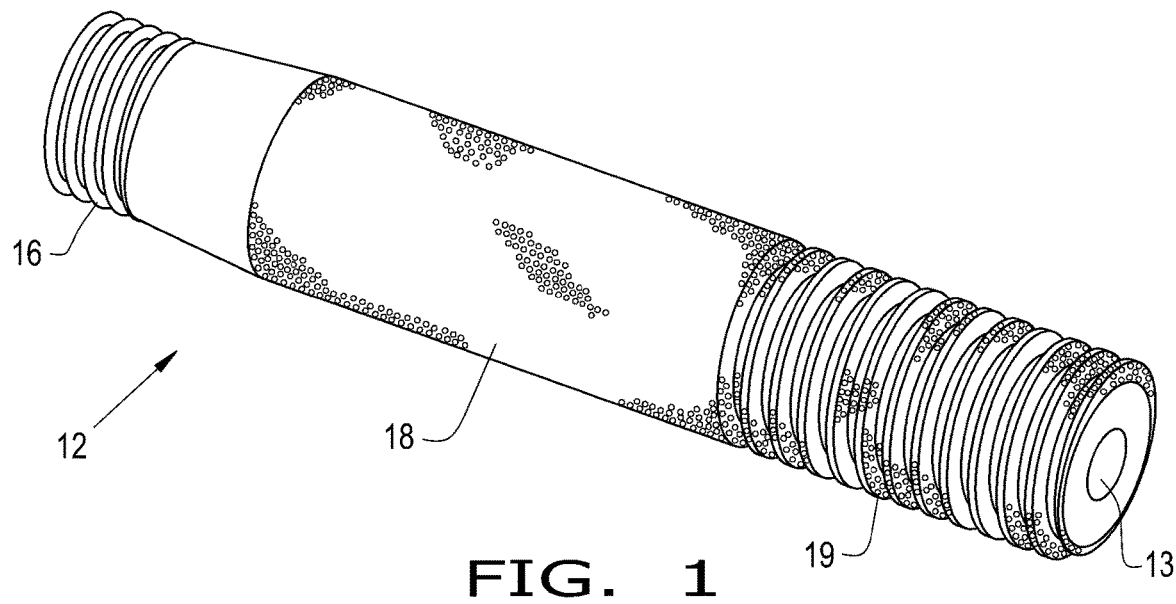
FIG. 1 is a perspective view of a shaft of a medical fastener in the form of a bone screw according to the present invention.

The present invention is directed to a medical fastener, or parts thereof, which enhance fixation in a tissue, such as bone tissue.

The present invention in one form is directed to a bone screw configured for fastening to bone, the bone screw including a shaft with a threaded proximal section, a porous central section, and a threaded porous distal section.

The present invention in another form is directed to a head of a medical fastener such as a bone screw, the head including at least one locking mechanism configured for locking to bone. The locking mechanism can include a first locking mechanism including a plurality of teeth which are configured for engaging and fixing to bone. The locking mechanism can include a second locking mechanism, alternatively or in addition to the first locking mechanism, annularly disposed about an inner radial wall of the head, the inner radial wall of the head configured for threadably engaging a shaft of the bone screw, the second locking mechanism forming a polymer ring configured for providing resistance to thread loosening relative to the shaft. The locking mechanism can include a third locking mechanism, alternatively or in addition to the first and second locking mechanisms, including a plurality of spikes disposed about an inner radial wall of the head, the inner radial wall of the head configured for threadably engaging a shaft of the bone screw, the spikes configured for moving between an engaged position and an unengaged position, the spikes in the engaged position configured for protruding radially inwardly from the inner radial wall and thereby for engaging the shaft so as to prevent rotation of the head relative to the shaft. The present invention can further include a method of using any of these embodiments of this head.

The present invention in another form is directed to a medical fastener such as a bone screw, the screw including a shaft with a bore configured for receiving an insert and a central section, which can be porous, configured for moving between a nonexpanded position and an expanded position, the insert moving the central section from the nonexpanded position to the expanded position when the insert is pushed into the bore and/or turned in the bore, the expanded position configured for locking the bone screw to the bone. The present invention can further include a method of using this bone screw, the method including the steps of inserting the insert into the bore, and moving the central section from the nonexpanded position to the expanded position so that the central section locks to the bone.

The present invention in yet another form is directed to a medical fastener such as a bone screw, the screw including a shaft with a bore and a distal end, the bore configured for receiving an insert, the distal end configured for moving between a closed position and an open position, the insert moving the distal end from the closed position to the open position when the insert is pushed into the bore, the open position configured for locking the bone screw to the bone. The present invention can further include a method of using this bone screw, the method including the steps of inserting the insert into the bore, and moving the distal end of the screw from the closed position to the open position so that the distal end locks to the bone.

The invention in yet another form is directed to a tissue fusion mechanism including a medical fastener such as a bone pin, first and second buttons, and a suture, the pin having a bore and being configured for being positioned in a bone portion, the first button seated in a groove on the head of a pin, the second button configured for being positioned adjacent another bone portion, the suture being connected at opposing ends respectively to the first and second buttons and proceeding through the bore of the pin and thereby for providing compression to the bone portions to thereby cause fusion of the bone portions.

The invention in yet another form is directed to a method of fusing tissue, such as bone, the method including the steps of inserting a medical fastener such as a bone pin or bone screw into a pre-drilled hole in a first bone portion, attaching a suture at opposing ends thereof to respective first and second buttons, passing the second button through the bore of the pin, affixing the second button to a second bone portion, pulling the suture tight to create linear compression between the two bone portions, seating the first button to a groove in the head of the pin.

The invention in yet another form is directed to a tissue fusion mechanism including first and second buttons and a suture, each button configured for positioning adjacent to a bone portion, the suture attached at opposing ends thereof to respective ones of the first and second buttons, the suture and buttons together configured for providing compression to thereby fuse the bone portions together.

The invention in yet another form is directed to a method of fusing tissue, such as bone, the method including the steps of drilling a hole in a first bone portion with a drill with a bore, attaching a suture at opposing ends thereof to respective first and second buttons, passing the second button through the bore of the drill, affixing the second button to a second bone portion, pulling the suture tight to create linear compression between the two bone portions, affixing the first button to the first bone portion after removing the drill.

Referring now to the drawings, and more particularly to FIG. 1, there is shown a shaft 12 of a bone fusion device, namely, a medical fastener in the form of a bone screw configured for fastening to a bone, the shaft 12 generally including a threaded proximal section 16 configured for facilitating a compression, a porous central section 18, and a threaded porous distal section 19 (such porosity can aid in bone ingrowth and fixation). The porosity can be formed through the entire radius of the shaft or only partly thereof. Further, as shown in FIG. 1, shaft 12 can include a longitudinally extending bore 13, which can be a through-bore and may also be referred to as a "cannulation", extending from the proximal to the distal end 16, 19 of the shaft 12. The proximal end, corresponding with the proximal section 16, is the end that is configured for being driven by a drill or a workpiece used by a user or otherwise contacted by the user, whereas the distal end is the leading end of the shaft 12 as it is inserted into the bone, likely a pre-drilled hole in the bone. Optionally, the shaft 12 may have no such bore 13. The threads of the proximal section 16 are configured to receive a threaded head 14 which is configured for tightening the screw 10 into the bone and thereby providing increased linear compression into the bone.

Figure 2:
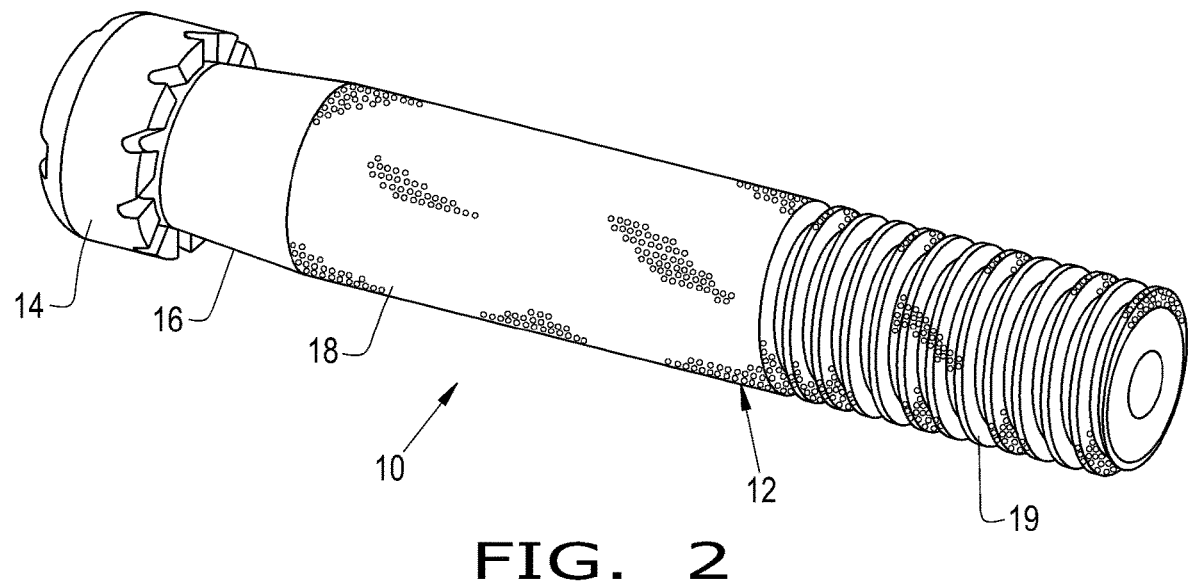
FIG. 2 is a perspective view of another embodiment of the bone screw according to the present invention.

FIG. 2 shows a bone screw 10 including a modular head 14 and a shaft 12. The head 14, which can be referred to as a compression head, is configured for providing additional linear compression. The shaft 12 of FIG. 2 is similar to the shaft of FIG. 1 and thus retains the same reference character as in FIG. 1, except that, as in alternative embodiments, it lacks a bore or it can have in the bore an insert or filler material. The head 14 is shown here as being threaded onto, and thus threadably connected to, the threaded proximal section 16 of the shaft 12. Further, the head 14 in FIG. 2 is understood to be a generic representation of the various embodiments of the head shown in FIGS. 3-8, and could be used on the head of any other fastener in the remaining figures depending upon the application.

The bone screw 10 of FIG. 2, and any of the embodiments of fasteners described herein, including shaft 12 of FIG. 1, can comprise a metal such as titanium, a polymer such as polyether ether ketone (PEEK), or any suitable material, composite, or mixture thereof, and can be made using any suitable manufacturing process. Further, the shaft 12 can be used or combined with other embodiments disclosed herein to provide compression, and/or can be used in conjunction with Herbert/Whipple devices and/or a compression head. Such formations or combinations are not intended to be limiting.

Figure 3:
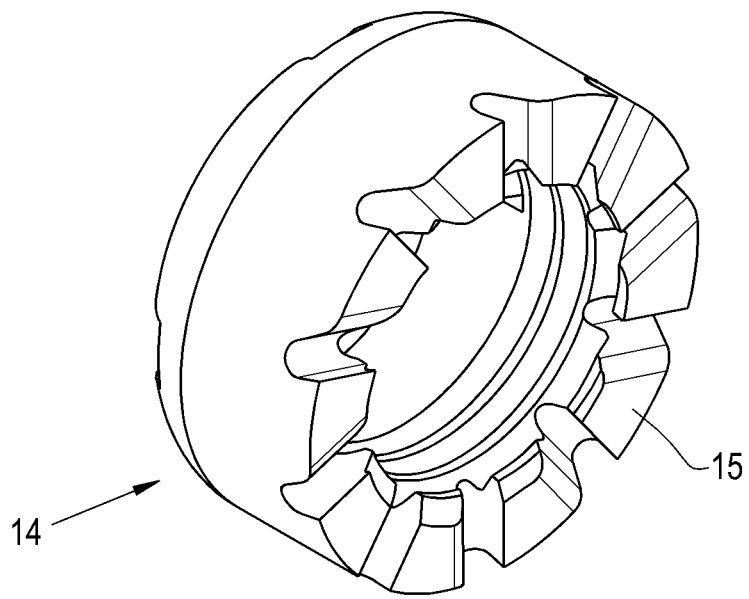
FIG. 3 is a bottom perspective view of the head of the bone screw of FIG. 2.

As shown in in FIG. 3, the head 14 includes an inner threaded wall that is configured for threadably engaging a shaft of the bone screw, specifically, the threaded proximal section 16 of the shaft. The head 14 can further include at least one locking mechanism configured for locking to bone. FIG. 3 shows the head 14 with a locking mechanism formed as a plurality of teeth 15. The head 14 also includes teeth 15 on a distal side of the head 14. The teeth 15 can be cut into the head 14 and are configured for engaging with bone and allowing tightening onto the bone and thereby preventing the screw 10 from backing out of the bone after insertion into the bone. Thus, the teeth 15 are configured for engaging and fixing to bone as the bone screw 10 is screwed into the bone, that is, cutting into the bone as the head 14 is turned and thereby gripping the bone. Such teeth 15 constitute a passive compression head locking mechanism.

Figure 4:
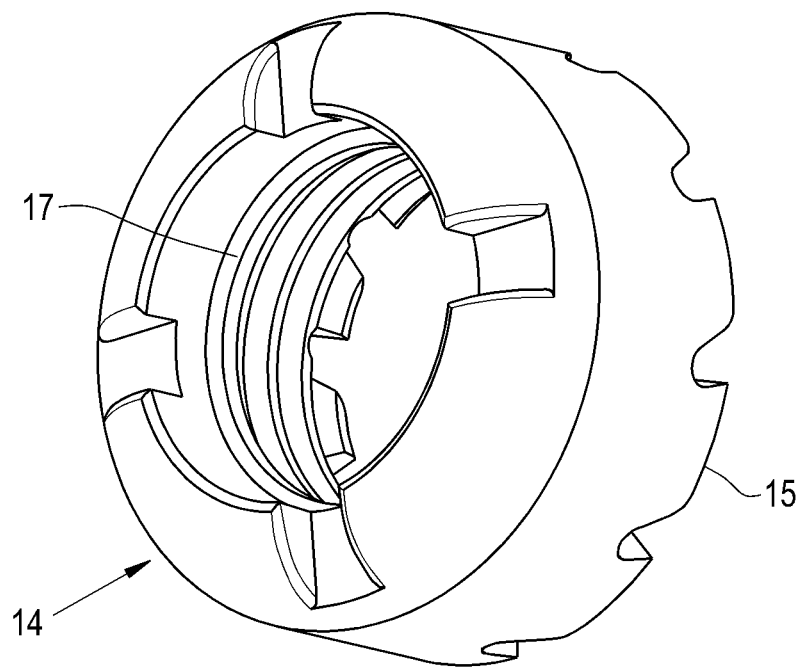
FIG. 4 is a top perspective view of the head of the bone screw of FIG. 2.

As shown in FIG. 4, the head 14 can include, alternatively or in addition to the teeth 15, a locking mechanism formed as a polymer ring 17, which can be made of PEEK. The polymer ring 17 is annularly disposed about and coupled with an inner threaded wall (which is an inner radial wall) of the head 14 and is configured for providing resistance to the head 14 loosening relative to the shaft 12. The polymer ring 17 can be integrally formed with the inner threaded wall of the head 14 or otherwise affixed to the inner threaded wall. Polymer ring 17 is configured for securing head 14 with shaft 12. Polymer ring 17 constitutes a passive compression head locking mechanism.

Figure 5:
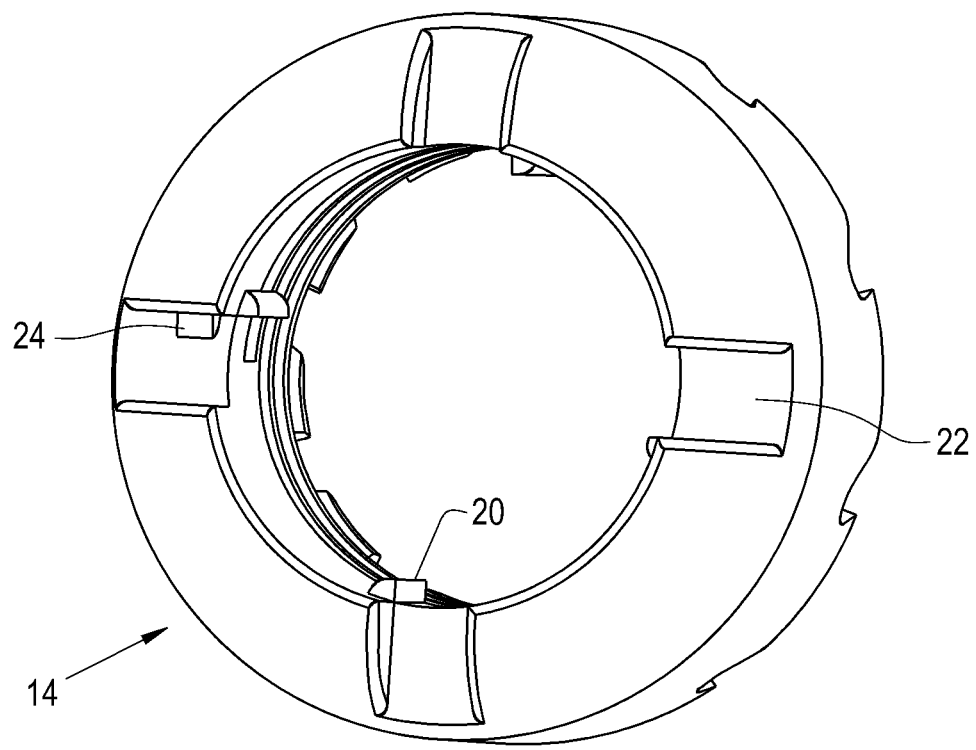
FIG. 5 is a top perspective view of yet another embodiment of the head of the bone screw according to the present invention, with spikes shown in the engagement position.

As shown in FIGS. 5-8, the head 14 can include, alternatively or in addition to the teeth 15 and/or polymer ring 17, a locking mechanism including a plurality of spikes 20 coupled with and disposed about the inner radial wall of the head 14 which is configured for engaging shaft 12 of the bone screw. Such spikes 20 constitute an active compression head locking mechanism. The spikes 20 are configured for selectively moving between an engaged position and an unengaged position, the spikes 20 in the engaged position being configured for protruding radially inwardly from the inner radial wall and thereby for engaging the shaft 12 so as to prevent rotation of the head 14 relative to the shaft 12. In use, a screwdriver engages the four grooves 22 shown in FIGS. 5 and 6 at the 12, 3, 6, and 9 o'clock positions of a proximal side of the head 14. It should be appreciated that while four grooves 22 that are equally spaced from adjacent grooves 22 are illustrated and described, the number of grooves and associated spikes 20 may be adjusted as desired. In the 9 o'clock groove of FIG. 5, a lever 24 (which can be formed as, for example, a lever, button, or wedge) is shown projecting from one or more walls of that groove 22 (head 14 includes lever 24 coupled with spikes 20). When a screwdriver is not engaged in these grooves 22, as shown in FIG. 5 the spikes 20 protrude from the inner radial wall of the head 14 (either from a nonthreaded section of the inner radial wall, a threaded section, or both the nonthreaded and threaded sections) and are thus in the engaged position. In this engaged position, the spikes 20 protrude and thereby cause interference with the shaft 12 and prevent the head 14 from rotating relative to the shaft 12, locking the head 14 in position to reduce the risk of losing compression in the tissue due to the head 14 displacing. When the screwdriver is engaged with the grooves 22 (FIG. 6 does not show the screwdriver but does show how the head 14 appears when the screwdriver is in the grooves 22), the screwdriver contacts the lever 24 in the 9 o'clock groove 22 and thereby triggers or otherwise causes the spikes 20 to retract into the inner radial wall such that the spikes 20 are then in an unengaged position. The retraction of the spikes 20 allows a user such as a surgeon to selectively tighten or loosen the head 14 relative to the shaft 12. Once the user is done tightening or loosening the head 14 relative to the shaft 12, the screwdriver is removed and the spikes 20 extend back into the engaged position with the shaft 12.

Figure 6:
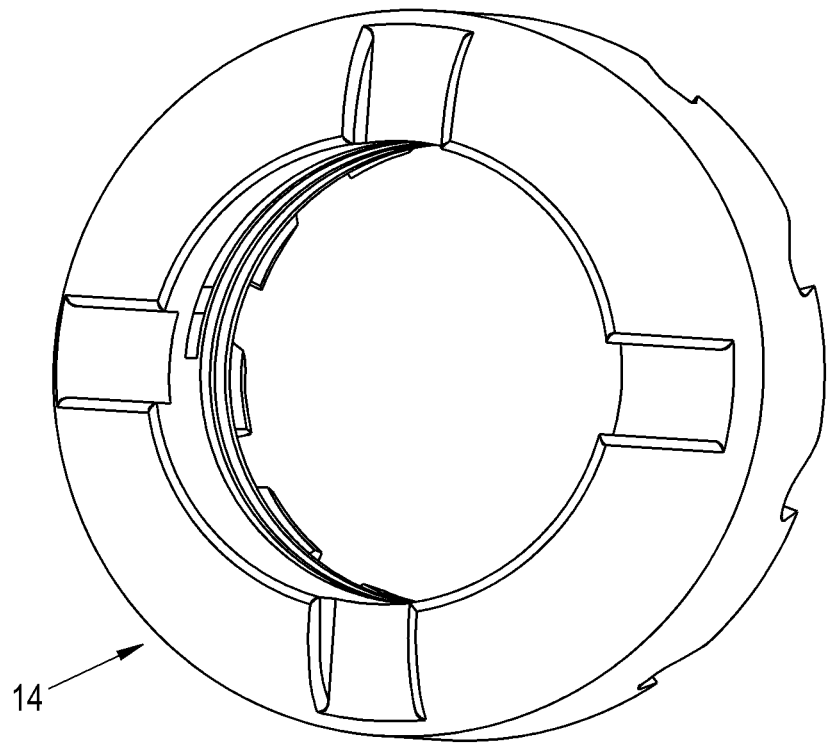
FIG. 6 is a top perspective view of the head of the bone screw of FIG. 5, with the spikes in an unengaged position.
Figure 7:
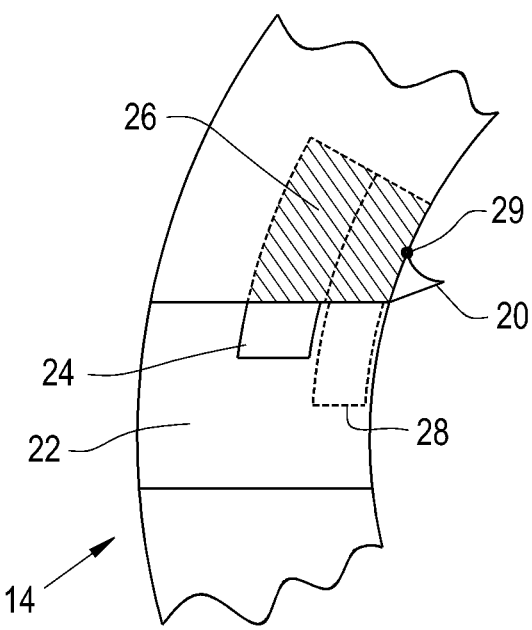
FIG. 7 is generally a top, perspective, partially cut-away view of the head of the bone screw showing spikes in their engaged position, similar to FIG. 5.
Figure 8:
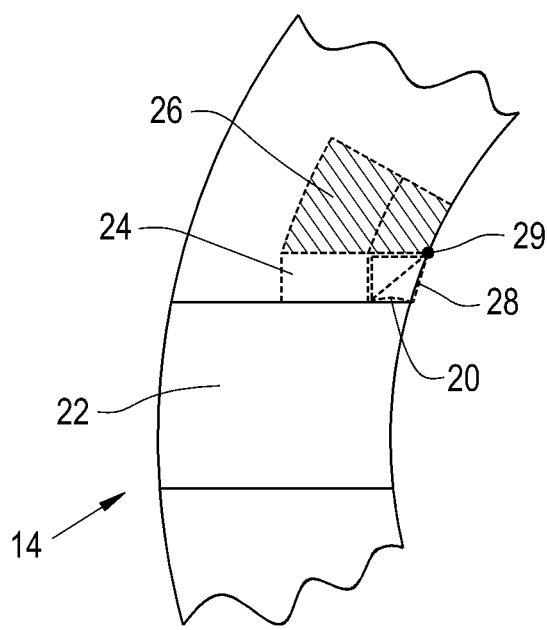
FIG. 8 is generally a top, perspective, partially cut-away view of the head of the bone screw showing spikes in their retracted position, similar to FIG. 6.

FIGS. 7-8 show more clearly how the spikes 20 are moved between their engaged and unengaged (retracted) positions. Showing head 14 of FIGS. 5 and 6 with portions broken away, FIG. 7 shows the spikes 20 in their engaged position, together with the lever 24 disposed within a groove 22 of the head 14. When a screwdriver is not engaged with the head 14 and thus not seated in the grooves 22 of the head 14 and on the lever 24, the lever 24 is out in the 9 o'clock groove 22, which pulls an inner mechanism 26 moveably disposed within a body of the head 14. The lever 24 and the inner mechanism 26 can be connected directly or indirectly with one another, or formed integral relative to one another, so that movement of one, such as the lever 24, causes movement of the other. When the lever 24 is out as in FIG. 7, the lever 24 pulls the inner mechanism 26. The inner mechanism 26 includes one or more openings or holes 28 each configured to receive a corresponding spike 20 when the spikes 20 are in their unengaged (retracted) positions. FIGS. 7-8 show one spike 20 and thus one corresponding opening 28. The opening 28 for the spike 20 is thus part of the inner mechanism 26. The pulling of the lever 24 on the inner mechanism 28 forces the spike 20 out of its opening 28 in the inner mechanism 26 and thus into the radially inward space defined by the head 14, that is the central bore that the inner radial wall of the head 14 defines, as clearly shown in FIG. 6. The spike 20 rotates about a hinge 29 so as to pivot between the unengaged and engaged positions of the spike 20; the hinge 29 can be disposed on the body of the head 14, slidably disposed on the inner mechanism 26, or on any suitable structure. When the spikes 20 are forced into this radially inward bore of screwhead 14, the spikes 20 engage the shaft 12 of the screw and thereby prevent rotation of the head 14 relative to the shaft 12. The lever 24 and the inner mechanism 26 can be biased by a biasing mechanism, such as a spring or shape-memory alloy, e.g., nitinol, driven mechanism (not shown), so that the spikes 20 are in the engaged position. That is, absent the screwdriver engaging the lever 24, the biasing mechanism urges, directly or indirectly, the lever 24 to return into the 9 o'clock groove 22 and the inner mechanism 26 into the position that forces the spikes 20 out of their respective holes 28.

Showing head 14 of FIGS. 5-7 with portions broken away, FIG. 8 shows the positioning of the lever 24, the inner mechanism 26, and a spike 20 when a screwdriver (not shown) engages the lever 24 in the 9 o'clock groove 22 of FIGS. 5 and 7. When the screwdriver engages the lever 24 (such as by pushing on the lever 24, causing the lever 24 to move laterally relative to a bottom surface of the groove 22, optionally by way of a ramped surface on the lever 24), the screwdriver pushes the lever 24, which pushes the inner mechanism 26 and thus moves the inner mechanism 26. This movement of the inner mechanism 26 exposes the respective opening or hole 28 to the spike 20, and the spike 20 moves into or is otherwise forced into the opening 28 by the rotating motion as the head 14 is tightened onto the shaft 12, the shaft 12 thereby cooperating with the spike 20 to urge the spike 12 into its corresponding hole 28 in the inner mechanism 26.

The present invention can further include methods of using any of these embodiments of the head 14.

Figure 9:
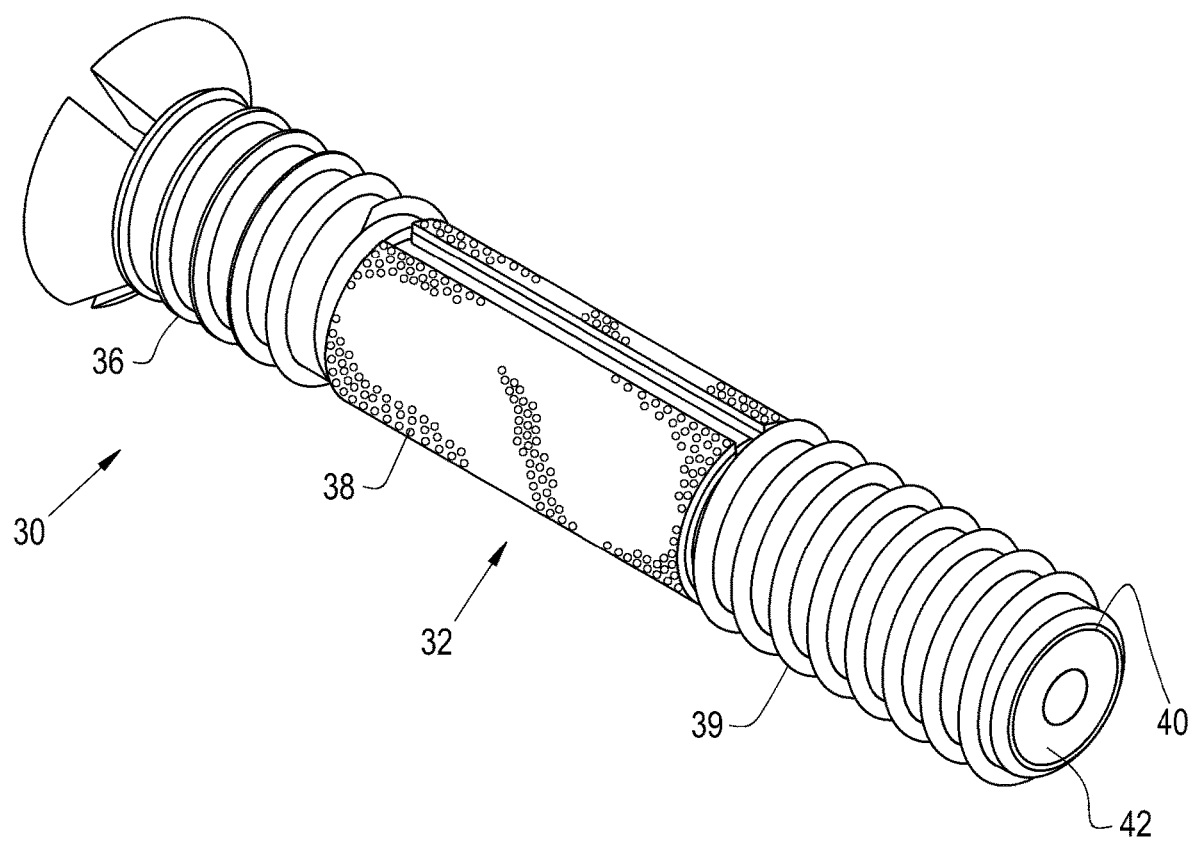
FIG. 9 is a perspective view of yet another embodiment of the bone screw according to the present invention.

Turning now to FIGS. 9-13, and more particularly to FIG. 9, according to an embodiment of the medical fastener of the present invention there is shown a bone screw 30 including a shaft 32 with an expandable, portion, namely, central section 38 and a bore 40 configured for receiving an insert 42 therethrough (central section 38, forming the expandable portion, is configured for facilitating a compression of bone). As shown in FIG. 9, central section 38 can be at least partially porous on an outer radial wall and is configured for moving between a nonexpanded (unexpanded) position and an expanded position. The insert 42 moves longitudinally in the bore 40 and can be inserted in a proximal end of the bore 40 and be pushed at least into the central section of the bore 40, or optionally all the way to the distal tip of the shaft 12 (as shown in FIG. 9). The central section 38 expands to provide radial compression onto the bone, thereby enabling the fastener to more securely fasten into the bone. As shown in FIG. 9, the central section 38 can be split longitudinally (forming a split) and thereby include split ends, with the split ends being able to move away from each other and relative to proximal and distal sections 36, 39 of the shaft 32 of the screw 30. The split ends are relatively close to one another in the unexpanded position and relatively far away from one another in the expanded position. Opposite the split, the central section 38 can be affixed to the proximal and distal sections 36, 39 of the shaft 32. The insert 42 is configured for moving the central section 38 from the nonexpanded position to the expanded position when the insert 42 is pushed into the bore 40 and/or turned in the bore 40, the expanded position configured for locking the bone screw 30 to the bone.

Figure 10:
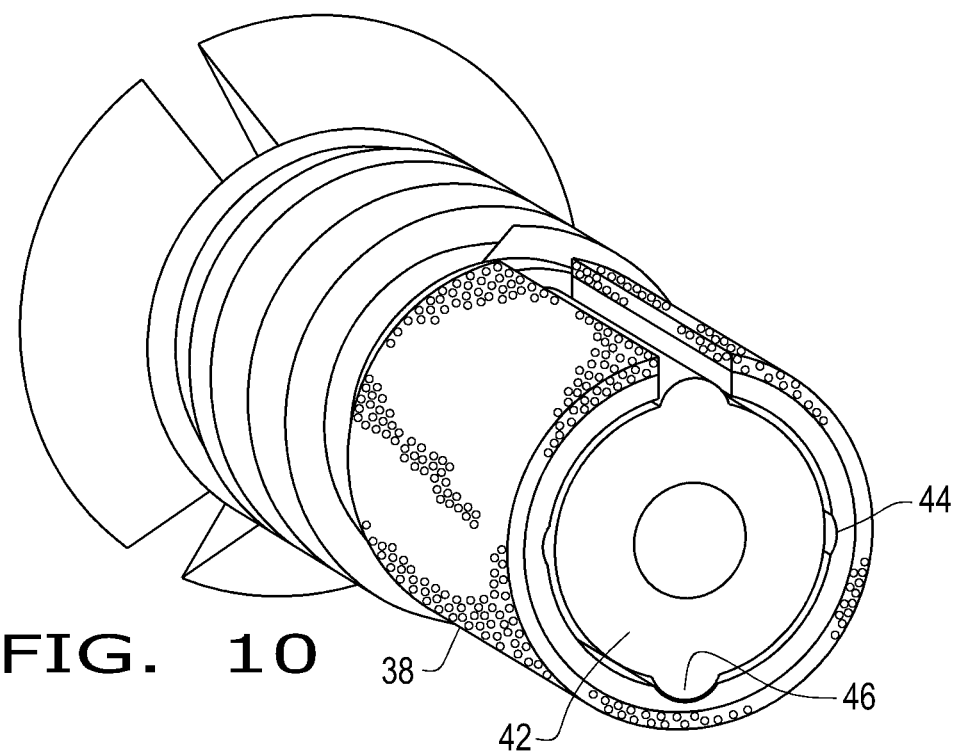
FIG. 10 is a perspective, cross-sectional view of the bone screw of FIG. 9 in a nonexpanded position, the section taken perpendicularly through the central section of the shaft.
Figure 11:
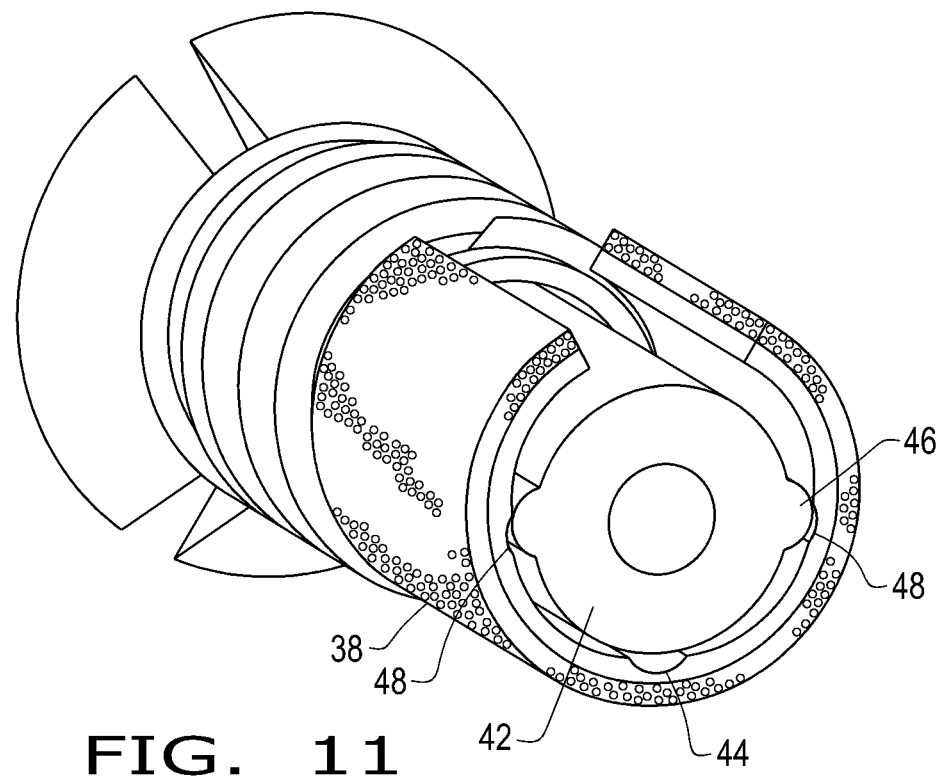
FIG. 11 is a perspective, cross-sectional view of the bone screw of FIG. 9 in an expanded position, the section taken perpendicularly through the central section of the shaft.

FIGS. 10-11 show one way of expanding the central section 38. That is, the insert 42 can be inserted into and thus be received by the bore 40 to the distal end of the shaft 32 and then turned or rotated—optionally, 90 degrees as shown in FIGS. 10-11—to radially expand the central section 38. The inner radial wall of the shaft 32 can include a depression or longitudinally extending groove or channel 44 that is opposite the split ends of the central section (thus, bore 40 includes grooves 44). The insert 42 can have opposing, longitudinally extending protrusions 46, which may extend longitudinally along the outer radial wall of the insert 42, optionally for a length corresponding to the length of the central section 38 of the shaft 32 or the entire length of the shaft 32. A respective one of protrusions 46 is configured for selectively seating in a respective one of grooves 44. Upon seating the insert 42 into the groove 44 opposite the split ends, the central section 38 is in the nonexpanded position, as shown in FIG. 10. The user can turn the insert 42 90 degrees in either direction, thereby unseating the protrusion 46 from a 6 o'clock position in FIG. 10 and moving that protrusion to either the 3 or 9 o'clock position as shown in FIG. 11. In so doing, the protrusions 46 cause the central section 38 to expand a distance approximately corresponding to the height of the protrusions 46. Upon finishing the turn, the protrusions 46 can seat in grooves 48 in the bore 40 at the 3 and 9 o'clock positions, these grooves 48 at the 3 and 9 o'clock position being shallower than the groove 44 at the 6 o'clock position, providing a tactile feel to the user that the insert 42 has been rotated a sufficient amount, and preventing undesirable further rotation of the insert 42. Optionally, the 3 and 9 o'clock grooves 48 need not be provided. The expanded position of the central section 38 further locks the bone screw 30 to the bone by producing a tighter interference fit.

Figure 12:
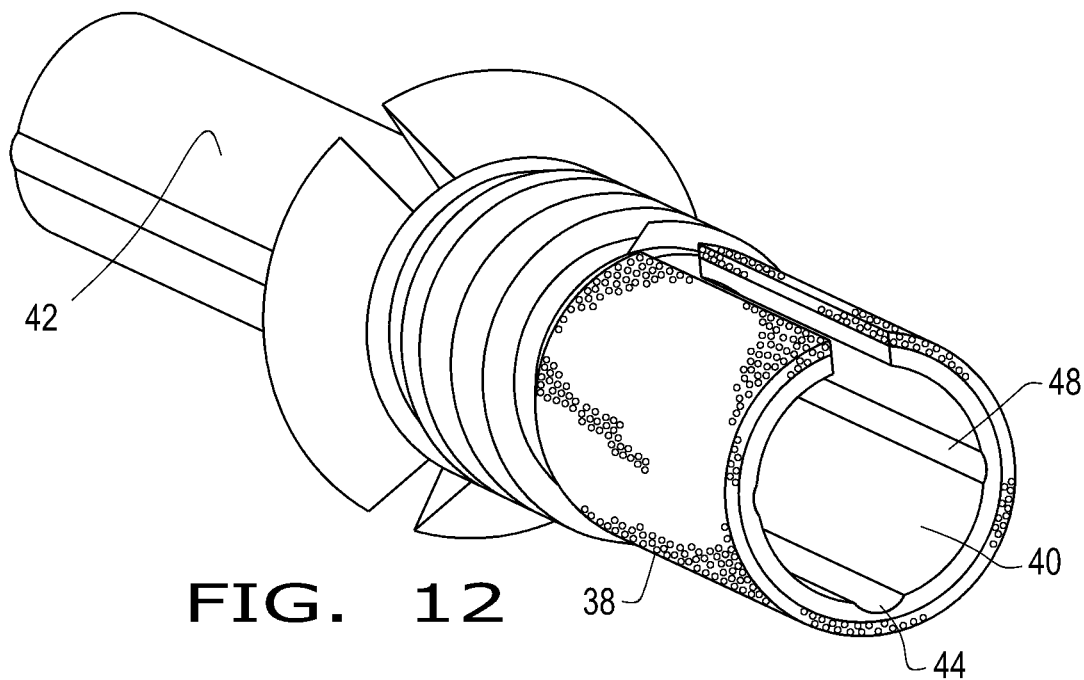
FIG. 12 is a perspective, cross-sectional view of the bone screw of FIG. 9 in a nonexpanded position, the section taken perpendicularly through the central section of the shaft, with the insert withdrawn.
Figure 13:
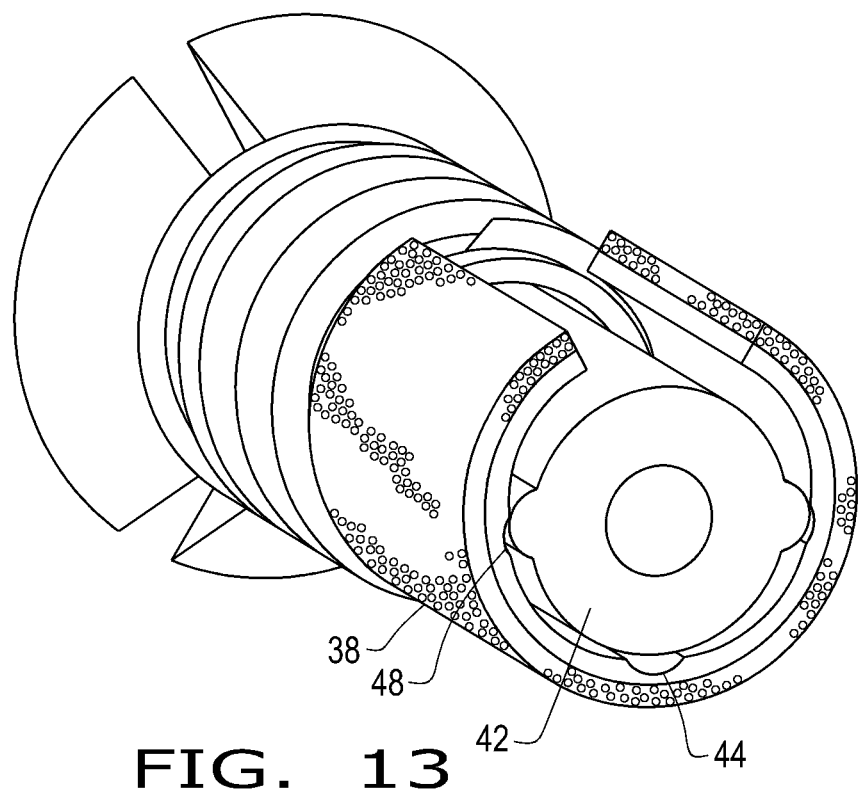
FIG. 13 is a perspective, cross-sectional view of the bone screw of FIG. 9 in an expanded position, the section taken perpendicularly through the central section of the shaft.

FIGS. 12-13 show another way of expanding the central section 38. That is, the insert 42 can be inserted into the bore 40 to the distal end of the shaft 32. The bore 40 of the shaft 32, as shown in FIG. 12, can include a longitudinally extending groove 44 at the 6 o'clock position of the bore 40 opposite the split ends at the 12 o'clock position, as well as grooves 48 at the 3 and 9 o'clock positions of the bore 40, the grooves 44, 48 optionally running the length of the central section 38. Rather than inserting the insert 42 all the way to the distal end of shaft 32, seating a protrusion 46 in the 6 o'clock groove 44, and then rotating the insert 42 to expand the central section 38, the user can begin by inserting the opposing protrusions 46 on the insert 42 into the 3 and 9 o'clock grooves 48 at the proximal end of the central section 38 and then pushing the insert 42 all the way to the distal end of the shaft 32. The 3 and 9 o'clock grooves 48 can be shallower than the 6 o'clock groove 44 so that the central section 38 indeed expands radially. Further, the 3 and 9 o'clock grooves 48 provide a tactile feel to the user that the insert 42 is in the correct position and prevents undesirable rotation of the insert 42 once seated in those grooves 48. Inserting the insert 42 in the 3 and 9 o'clock grooves 48 and pushing it through the bore 40 expands the central section 38.

The present invention employing an expanded center section is based off of a rotating cam concept designed for use in unicompartmental knee replacement.

Figure 14:
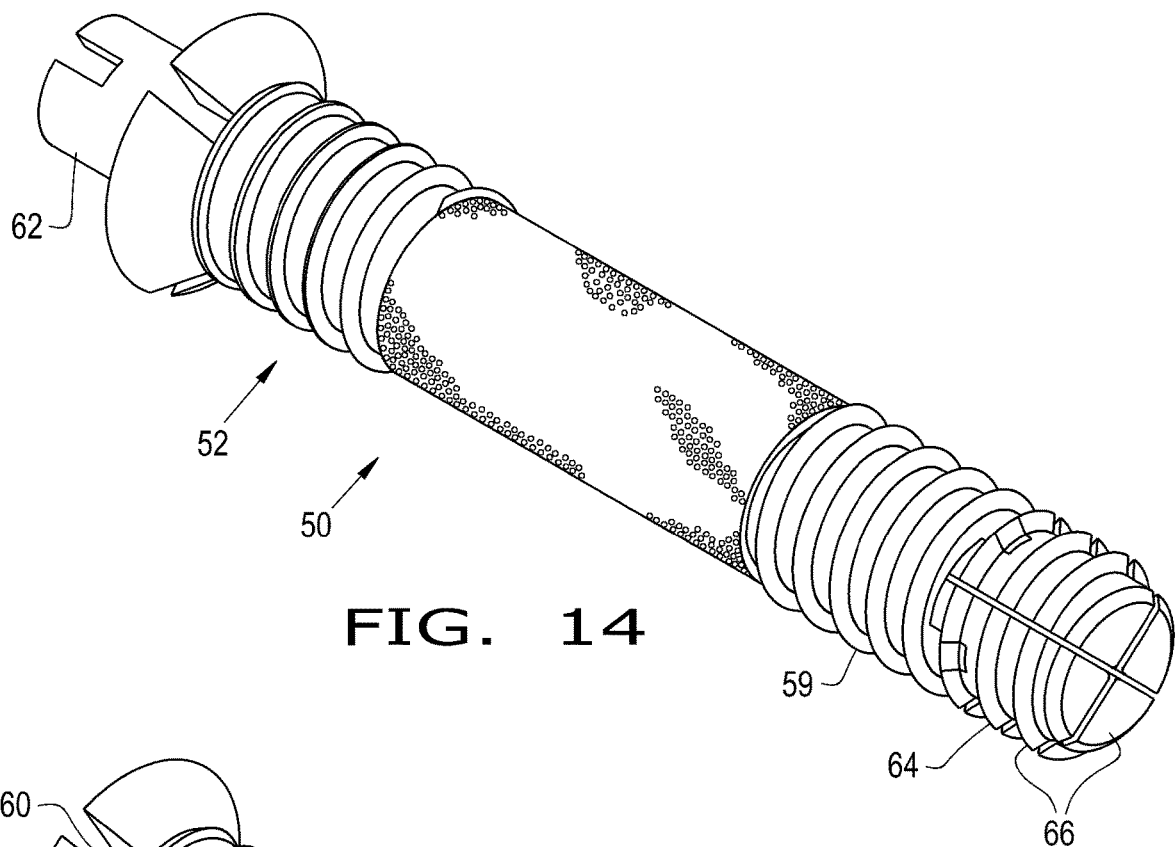
FIG. 14 is a perspective view of yet another embodiment of the bone screw according to the present invention, with an unexpanded tip.
Figure 15:
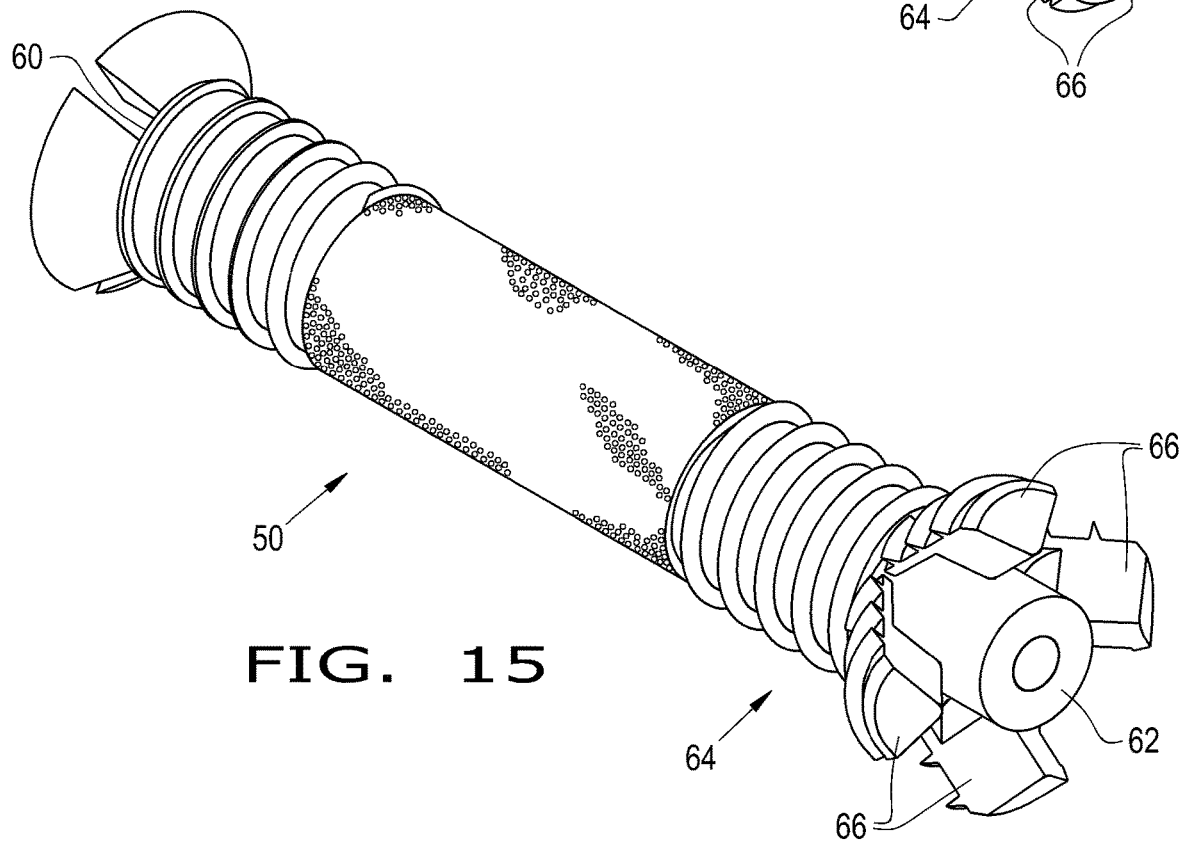
FIG. 15 is a perspective view of the bone screw of FIG. 14 with an expanded tip.

Turning now to FIGS. 14-15, according to an embodiment of the medical fastener of the present invention there is shown a medical fastener in the form of a bone screw 50 including a shaft 52 with a bore 60 and an expandable portion, namely, a distal end 64, which can also be called a tip (shaft 52 can also include a central section which can be porous, as shown in FIG. 14-15) (distal end 64, forming the expandable portion, is configured for facilitating a compression of bone). The bore 60 receives an insert 62 (and is thus configured for receiving insert 62). The distal end 64 is configured for moving between a closed position (an unexpanded position) as shown in FIG. 14 and an open position (an expanded position) as shown in FIG. 15. As the insert 62 is pushed through the bore 60 of the shaft 52, the insert 62 moves the distal end 64 from the closed position to the open position. The open position is configured for locking the bone screw 50 to the bone. That is, the insert 62 is pushed through the center of the implant 50 to expand the distal end 64, thereby providing stability in a bone such as an iliac bone or a sacrum bone. More specifically, the distal end 64 includes pivotable flanges 66, as shown in FIG. 15. Four, or another number, such flanges 66 can be provided, as shown in FIGS. 14-15. These flanges 66 are hinged to a more proximate portion of the shaft 52 and can be threaded on an outer radial wall of the distal end 64. In a closed position (unexpanded position), the threads of a distal section 59 of the shaft 62 can be continuous. An inner radial wall of the flanges 66 can include a radius that is smaller than an inner wall radius of a more proximate portion of the distal section 59 of the shaft 52. The reduction of the inner wall radius can be progressive, thereby facilitating movement of the insert 62. Thus, as the insert 62 encounters the reduced radius of the inner radial wall of the distal end 64 and proceeds to the distal extent of the shaft 52, the four flanges 66 expand radially outwardly as they pivot on their respective hinges (thus, flanges 66 are configured for moving between the closed position and the open position when bore 60 receives insert 62). In use, the user is provided with this bone screw 50 and the insert 62, screws the bone screw 50 into a hole in the bone (such as the sacrum), inserts the insert 62 into the bore 60 of the shaft 52 of the screw 50 to the distal end 64, and thereby moves the flanges 66 of the distal end 64 from the closed position (unexpanded position) to the open position (expanded position) so that the distal end 64 locks to the bone.

Figure 16:
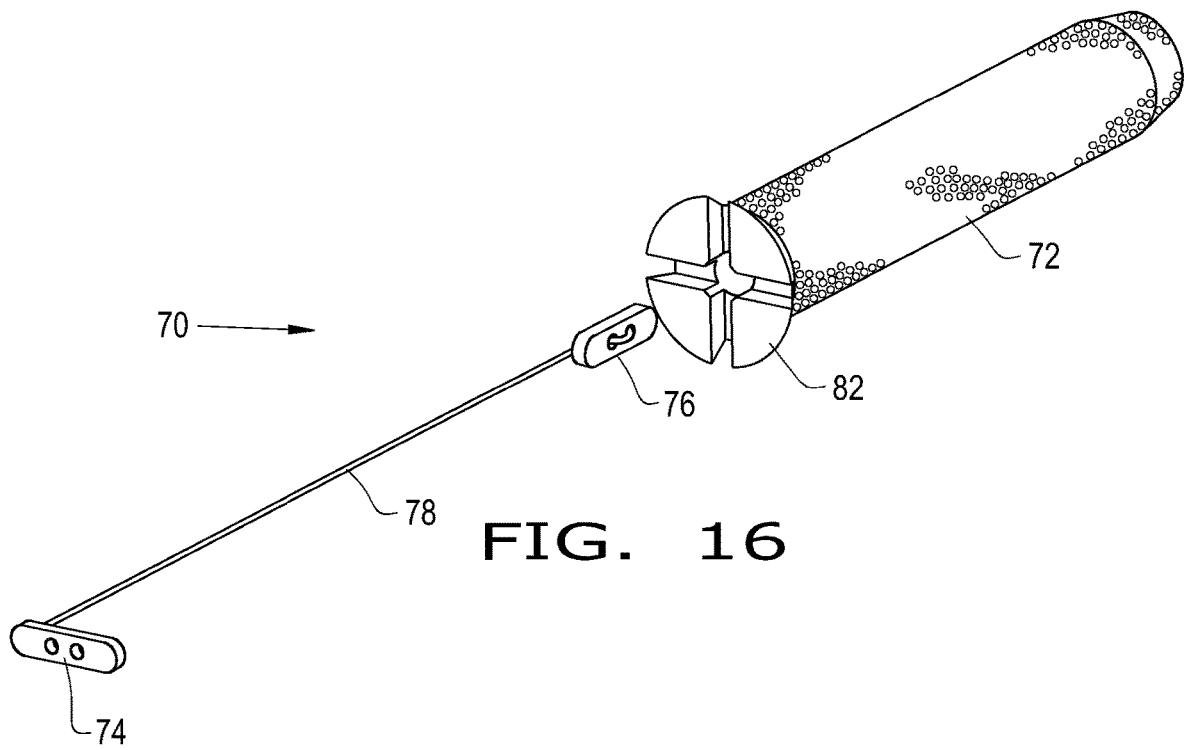
FIG. 16 is a perspective view of an embodiment of a tissue fusion mechanism according to the present invention, including a bone pin, buttons, and suture, the suture and buttons being apart from the pin.
Figure 17:
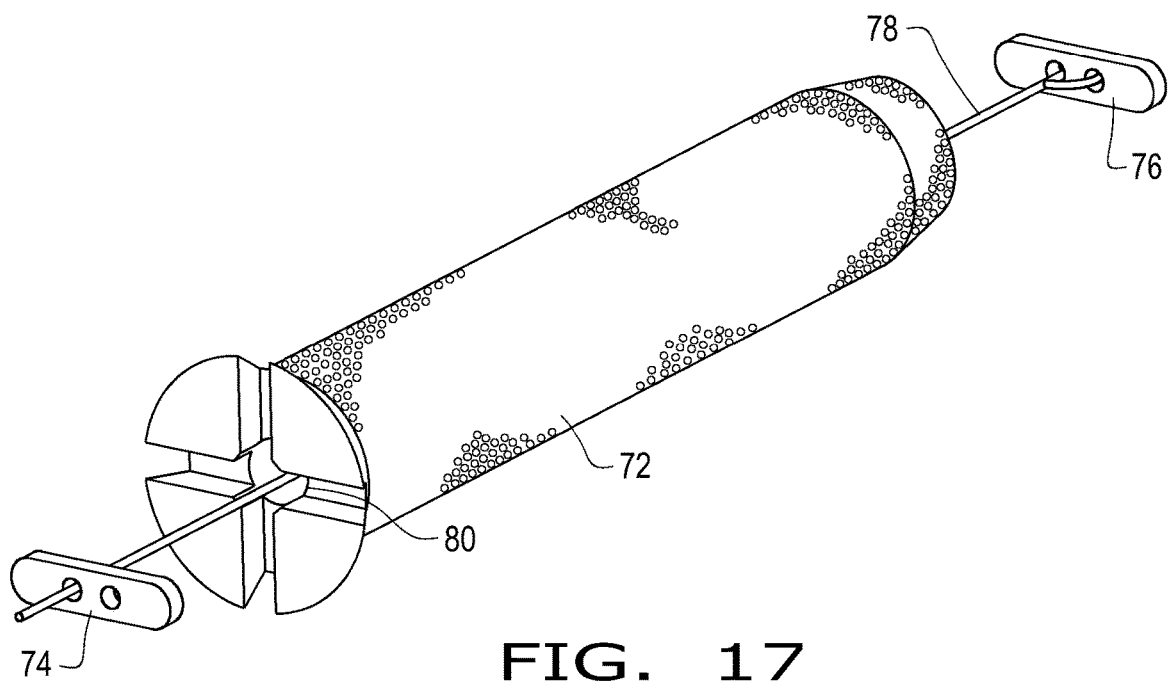
FIG. 17 is a perspective view of the bone fusion mechanism of FIG. 16, showing the suture extending through a bore in the pin.
Figure 18:
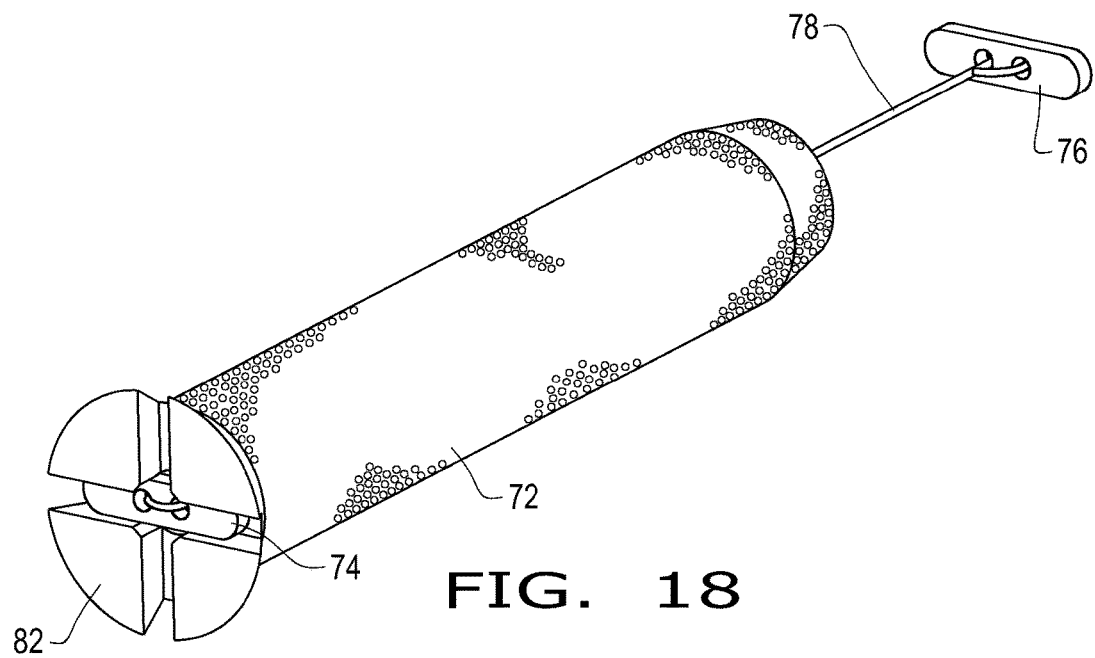
FIG. 18 is a perspective view of the bone fusion mechanism of FIG. 16, showing the suture extending through a bore in the pin, one button seated in the head of the pin.

Turning now to FIGS. 16-18, there is shown another embodiment of a tissue fusion mechanism 70 of the present invention, which provides suture compression. As shown in FIG. 16, the mechanism includes a bone pin 72 (other medical fasteners can be used, such as a bone screw), a first button 74, a second button 76, each button 74, 76 of which can have an elliptical shape with generally flat sides, and a suture 78 that attaches to button holes in the respective buttons 74, 76. The buttons 74, 76 can be identical to one another. The pin 72 can have a longitudinally extending bore 80 therethrough and a head 82 with at least one groove (pin 72 can also include a central section and a distal end each of which can be porous, as shown in FIG. 16-18). FIG. 16 shows the suture 78 tied or otherwise attached to the buttons 74, 76 via the button holes, the suture and button combination not yet having been inserted into the bore 80 of the pin 72. The user positions the pin 72 in a first bone portion, such as a hole in a bone, which can be an iliac bone 84 (seen in FIG. 19). FIG. 16 shows the pin 72 in position as if attached to an iliac bone, without showing the iliac bone, with the head 82 of the pin 72 being on a lateral side (outside surface) of the iliac. Thus, after the pin 72 is inserted into the iliac bone, the first button 76 is passed through the bore 80 of the pin 72 (such bore 80 is optionally referred to as a pin cannula 80), as shown in FIG. 17. The second button 76 is passed through the bore 80 of the pin 72 from the lateral side of the iliac bone 84 and is passed through a hole in another bone portion, such as a sacrum 86 (seen in FIG. 19). Once the first button 76 reaches desired stable bone (for example, the sacrum), the first button 76 is turned so that it cannot return through the hole in the sacrum and the cannula of the pin 72. That is, the second button 76 is turned so that one of its flat sides lies adjacent an opposing (posterior) side of the sacrum, the suture 78 passing back through the hole in the sacrum and extending back through the bore 80 of the pin 72 to the first button 74, to which the suture 78 is tied. The suture 78 is pulled tight, thereby providing linear compression across the iliac-sacrum joint, and the first button 74 is affixed. That is, the first button 74 can be seated in a groove on the head 82 of pin 72 as shown in FIG. 18. The suture 78 is tied tight to this fixation button 74 at the head 82 of the pin 72 so as to keep the desired amount of linear compression relative to the bone portions (for example, at the iliac-sacrum joint) to thereby cause fusion of the bone portions (for example, the iliac bone and sacrum). The pin 72 thus provides a conduit for the suture 78. The pin 72 may, but optionally may not, span the space between the iliac and sacrum. When the pin 72 does span that space, then the head 82 of the pin 72 can rest on the lateral side surface of the iliac bone, and the distal end of the pin 72 can rest against an inner (anterior) surface of the sacrum at the hole of the sacrum for the suture.

Figure 19:
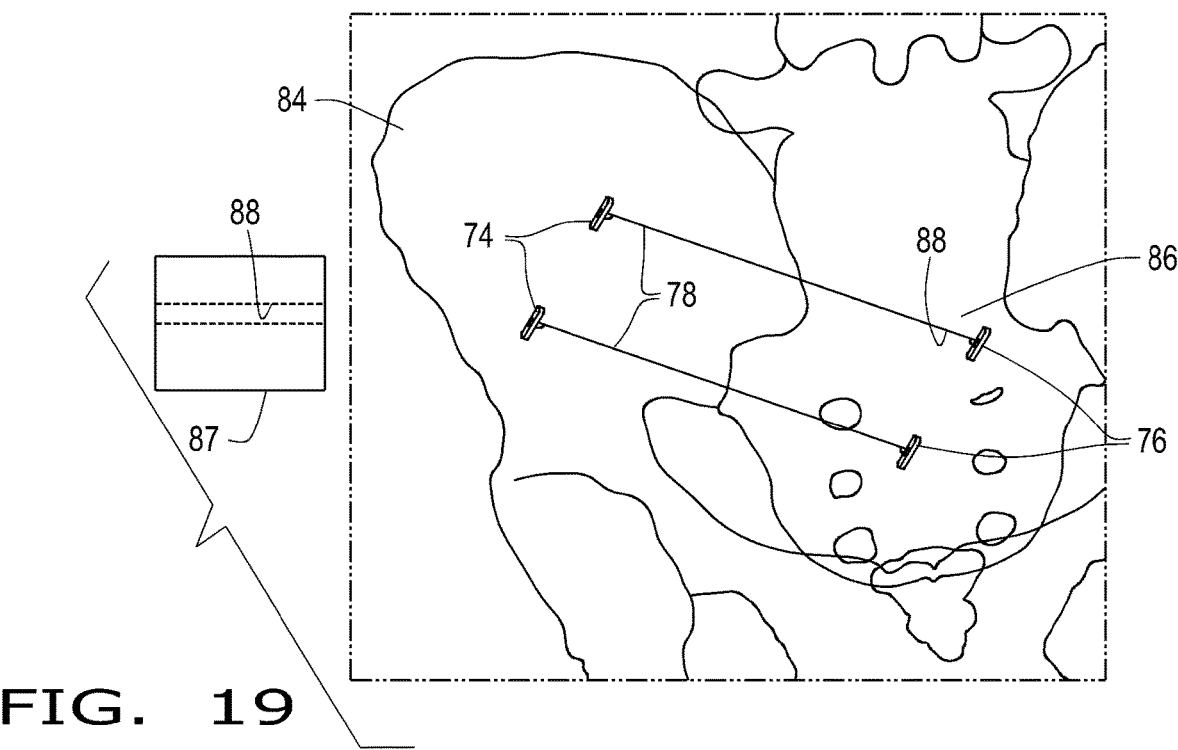
FIG. 19 is a perspective view of another embodiment of a tissue fusion mechanism according to the present invention.

Turning now to FIG. 19, an embodiment of a tissue fusion mechanism similar to that shown in FIGS. 16-18 is illustrated, less the bone pin 72 or screw. Rather, according to the embodiment in FIG. 19, a cannulated bone drill 87 (shown schematically in FIG. 19 as drill 87 with cannula 88), in part, substitutes for the cannulated pin 72. The suture 78 and the buttons 74, 76 are still used, similar to that in FIGS. 16-18. In FIG. 19, each button 74, 76 positions adjacent to a bone portion, such as to the lateral side of an iliac bone 84 for one button 74 and to the posterior side of a sacrum 86 for the other button 76, with the suture 78 attached at opposing ends thereof to button holes in the buttons 74, 76, so that the buttons 74, 76 and suture 78 together provide compression to thereby fuse the bone portions together. In use, a cannulated drill 87 is used to drill a hole in the iliac bone 84. The same drill 87, once passing through the iliac bone 84, can proceed to drill a corresponding hole in the sacrum 86; alternatively, the same drill 87, or another drill 87, can be repositioned to drill the hole in the sacrum 86. The opposing ends of a suture 78 are attached to respective buttons 74, 76, such as by tying each respective end to two button holes in a respective button 74, 76. The button 76 will be referred to further herein as an "initial fixation button," for reasons that will become clear further herein. The initial fixation button 76 is passed through the cannula (stated otherwise, the bore) of the drill 87 and thus through the hole in the iliac bone 84; and if the drill 87 proceeds to drill also the hole in the sacrum 86, then the initial fixation button 76 passes through the cannula of the drill 87 at the same time it passes through the hole in the sacrum 86. The initial fixation button 76 is affixed to the sacrum 86 after the hole has been drilled into the sacrum 86. The initial fixation button 76 is turned so that a flat surface engages adjacent to an outside (posterior) surface of the sacrum 86, the suture 78 proceeding back through the hole in the sacrum 86 and through the cannulated drill 87 to the other button 74. The drill 87 is removed from the bone(s), the suture 78 is pulled tight to create linear compression between the iliac bone 84 and sacrum 86, and the other button 74 is affixed to a lateral side surface (outside surface) of the iliac bone 84. As shown in FIG. 19, this procedure can be done two or more times with respective sets of buttons 74, 76 and sutures 78. Accordingly, the sutures 78 and buttons 74, 76 provide initial compression across a sacrum-iliac joint until fusion occurs.

Figure 20:
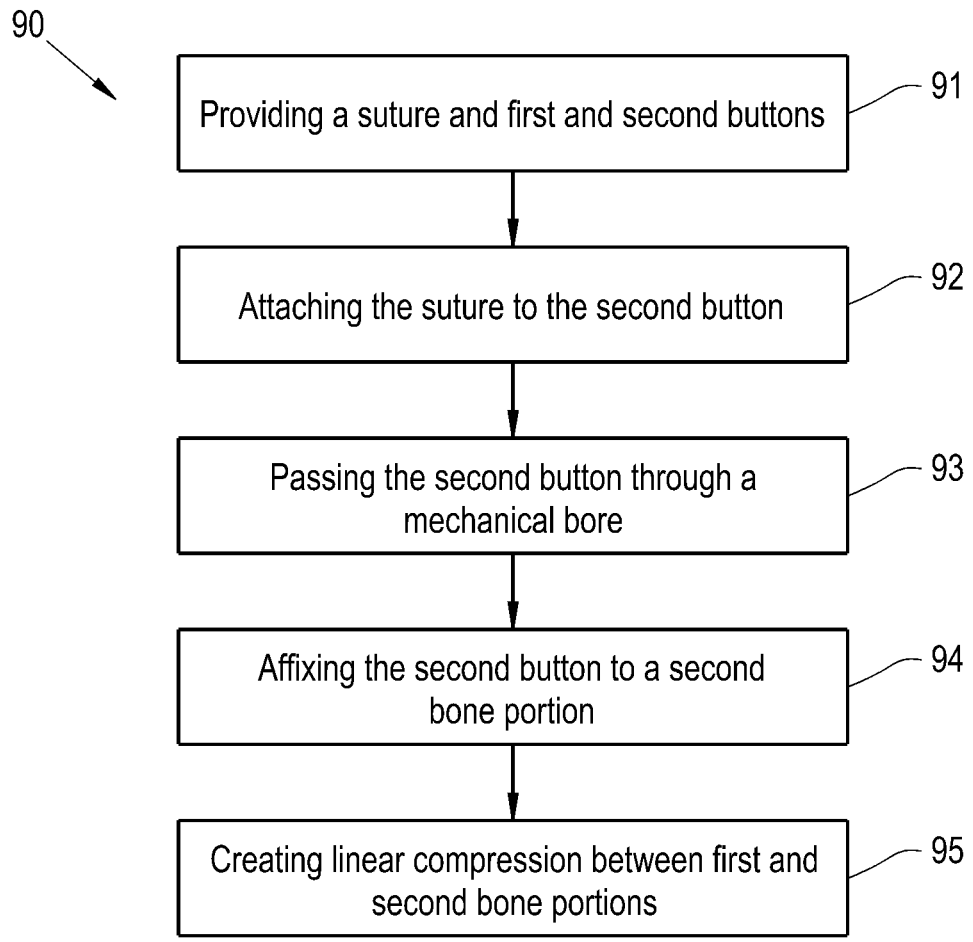
FIG. 20 is a flow diagram showing a method of fusing tissue together, according to an exemplary embodiment of the present invention.

Referring now to FIG. 20, there is shown a flow diagram of a method 90 of fusing tissue 84, 86 (such as bone tissue 84, 86) together, the method 90 including the steps of: providing 91 a suture 78, a first button 74, and a second button 76, the suture 78 including a first end and an opposing second end; attaching 92 the second end to the second button 76; passing 93 the second button 76 through a mechanical bore 80, 88 extending through a first bone portion 84; affixing 94 the second button 76 to a second bone portion 86; and creating 95 a linear compression between the first bone portion 74 and the second bone portion 86 by way of the suture 78, the first button 74, and the second button 76. Further, the mechanical bore 80 can be formed by a fastener 72. Further, the mechanical bore 88 can be formed by a bone drill 87.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A bone fusion device, comprising:
a shaft including a porous section and a threaded proximal section configured for facilitating a compression; and
a head threadably connected to the threaded proximal section, the head including a driving feature configured to be engaged by a tool to rotate the head and a plurality of teeth configured for engaging with a bone, at least one of the plurality of teeth being directly threadably engaged with the threaded proximal section, the bone fusion device being formed as a fastener, the head extending from a first longitudinal end to a second longitudinal end and comprising an unthreaded external surface that extends from the first longitudinal end to the second longitudinal end, wherein the plurality of teeth are formed in the second longitudinal end and the driving feature is located at the first longitudinal end, wherein the head is a monolithic structure and a diameter of the head taken at the external surface at the plurality of teeth is the greatest diameter of the head, and the shaft has an externally threaded distal section.

2. The bone fusion device of claim 1, wherein the head includes an inner radial wall and a ring coupled with the inner radial wall and configured for securing the head with the shaft.

3. The bone fusion device of claim 2, wherein the ring is a polymer ring.

4. The bone fusion device of claim 1, wherein the head includes an inner radial wall and a plurality of spikes coupled with the inner radial wall.

5. The bone fusion device of claim 4, wherein the plurality of spikes are configured for selectively moving between an engaged position and an unengaged position, the plurality of spikes in the engaged position being configured for protruding radially inwardly from the inner radial wall and thereby for engaging the shaft so as to prevent rotation of the head relative to the shaft.

6. The bone fusion device of claim 5, wherein the head includes a lever coupled with the plurality of spikes.

7. The bone fusion device of claim 1, wherein the threaded proximal section comprises threads defining a thread diameter and the diameter of the head taken at the external surface at the plurality of teeth is greater than the thread diameter.

8. The bone fusion device of claim 1, wherein the teeth are cut into the second longitudinal end of the head.

* * * * *